(12) United States Patent
Painter (10) Patent No.: US 6,989,770 B1
(45) Date of Patent: Jan. 24, 2006

(54) NAVIGATION SYSTEM THAT SUPPORTS MULTIPLE LANGUAGES AND FORMATS

(75) Inventor: Jeffrey E. Painter, Aurora, IL (US)

(73) Assignee: Navteq North America, LLC, Chicago, IL (US)

( * ) Notice: Subject to any disclaimer, the term of this patent is extended or adjusted under 35 U.S.C. 154(b) by 295 days.

(21) Appl. No.: 09/970,375

(22) Filed: Oct. 3, 2001

(51) Int. Cl.
*G08G 1/123* (2006.01)

(52) U.S. Cl. ............................ 340/995.12; 340/995.19; 701/208; 701/211

(58) Field of Classification Search ............ 340/995.19, 340/995.2, 995.23, 995.24, 995.12; 701/200, 701/201, 206, 209, 211, 213
See application file for complete search history.

(56) References Cited

U.S. PATENT DOCUMENTS

| | | | |
|---|---|---|---|
| 6,199,013 B1 | | 3/2001 | O'Shea ........................ 701/211 |
| 6,202,023 B1 | * | 3/2001 | Hancock et al. ............ 701/201 |
| 6,278,965 B1 | | 8/2001 | Glass et al. ................. 701/120 |
| 6,297,748 B1 | * | 10/2001 | Lappenbusch et al. ...... 340/905 |
| 6,336,072 B1 | | 1/2002 | Takayama et al. |
| 6,336,073 B1 | | 1/2002 | Ihara et al. ................. 701/202 |
| 6,381,534 B2 | | 4/2002 | Takayama et al. .......... 701/201 |
| 6,430,498 B1 | * | 8/2002 | Maruyama et al. ......... 701/200 |
| 6,477,526 B2 | * | 11/2002 | Hayashi et al. ................ 707/4 |
| 6,526,350 B2 | * | 2/2003 | Sekiyama .................... 701/209 |
| 6,532,418 B2 | * | 3/2003 | Chun et al. ................. 701/209 |
| 6,552,682 B1 | * | 4/2003 | Fan ........................ 342/357.09 |
| 6,553,309 B2 | * | 4/2003 | Uchida et al. .............. 701/208 |
| 6,614,363 B1 | * | 9/2003 | Behr et al. ............. 340/995.19 |
| 2002/0099499 A1 | | 7/2002 | Takayama et al. .......... 701/200 |
| 2002/0103597 A1 | | 8/2002 | Takayama et al. |

\* cited by examiner

*Primary Examiner*—Brent A. Swarthout
(74) *Attorney, Agent, or Firm*—Frank J. Kozak; Jon D. Shutter; Lawrence M. Kaplan

(57) ABSTRACT

A navigation system includes a navigation-related information server and one or more customer-interface servers. Each customer-interface server receives requests for navigation-related information from end users who have end user computing platforms. The end users send their requests for navigation-related information from end user computing platforms over a data network to the customer-interface servers. In order to respond to the end users, the customer-interface servers request language and format-independent navigation-related information from the navigation-related information server. The navigation-related information server receives the requests from the customer-interface servers. To response to each request for navigation-related information, the navigation-related information server uses one or more geographic databases to formulate language- and format-independent data structures. These language- and format-independent data structures are sent to the customer-interface servers. The customer-interface servers receive the language- and format-independent responses from the navigation-related information server, and formulate language- and format-specific responses that are sent to the end users. In one embodiment, the language and format-independent responses provided by the navigation-related information server are in XML format. The customer-interface servers use XML style sheets to formulate language and format-specific instructions that are sent to the end users.

11 Claims, 6 Drawing Sheets

NAVIGATION SYSTEM THAT SUPPORTS MULTIPLE LANGUAGES AND FORMATS

BACKGROUND OF THE INVENTION

The present invention relates to a navigation system, and more particularly, the present invention relates to a navigation system that includes a centrally-located server that provides language- and format-independent navigation-related information to one or more other servers, which in turn use the language- and format-independent navigation-related information to formulate specific navigation instructions which are provided to end users.

Navigation systems provide various useful features, such as calculating routes to desired destinations, providing guidance for following calculated routes, displaying maps, and so on. There are various computer architectures for navigation systems that deliver navigation-related features. In one type of architecture for a navigation system, end users use electronic devices to obtain navigation information from a remotely located server. The end users electronic devices may include general purpose devices, such as cell phones, personal digital assistants (PDAs), personal computers (desktop and portable), as well as special purpose devices, such as specially designed navigation system units. These end users' devices are used to send requests for navigation-related information over a communications network to the remotely located server. The communications network may include the Internet or any other type of communications medium. When the remotely located server receives a request for navigation information from an end user's device, it uses navigation application software programs and geographic data contained in one or more databases to determine a response to the request and then sends the response to the end user over the communications medium. An example of this type of navigation system is disclosed in U.S. Pat. No. 5,543,789, the entire disclosure of which is incorporated by reference herein.

This type of navigation system architecture provides several advantages. One advantage relates to providing updated geographic data. There is a continuing need to update the geographic data used by a navigation system. For example, new streets are built, road construction closes roads, detours are established, new businesses open, posted speed limits change, new turn restrictions are established at intersections, streets are renamed, and so on. These kinds of changes can affect travel through a geographic region. Accordingly, the geographic data used by a navigation system should be updated on a regular basis in order to accurately reflect changes in the represented geographic features. A computer architecture in which end users obtain navigation-related services from a single central server affords an advantage with respect to the updating of the geographic data. With a computer architecture in which end users obtain navigation-related services from a central server, updates need to be applied only to the geographic database(s) associated with the central server.

Although there are advantages associated with a navigation system architecture in which end users obtain navigation services from a central server, there are considerations that need to be addressed. One consideration relates to providing navigation-related information in a variety of different languages. As an example, some end users may want navigation information in English, whereas other end users may want navigation information in French, Spanish, or another language. Another consideration relates to providing navigation-related information for a variety of formats. As an example, some end users may have systems that support graphical images of maps that illustrate the navigation-related information, whereas other end users may have systems that support only text instructions. It would be preferable that a navigation server support various different languages and various different types of end user systems. However, this can be difficult to accomplish because of the relatively large number of different types of end user systems, as well as the number of different languages. Thus, there is a need for an improvement that facilitates the provision of navigation-related information to different kinds of end user computing platforms and in different languages.

SUMMARY OF THE INVENTION

To address these and other objectives, the present invention comprises a system and method that includes a navigation-related information server that provides navigation-related information in a language- and format independent format. The navigation-related information server responds to requests for navigation-related information from one or more customer-interface servers. Each customer-interface server receives requests for navigation-related information from end users that have end user computing platforms. The end users send their requests for navigation-related information from end user computing platforms over a data network to the customer-interface servers. In order to respond to the end users, the customer-interface servers request language and format-independent navigation-related information from the navigation-related information server. The navigation-related information server receives the requests from the customer-interface servers. To respond to each request for navigation-related information, the navigation-related information server uses one or more geographic databases to formulate language- and format-independent data structures. These language- and format-independent data structures are sent to the customer-interface servers. The customer-interface servers receive the language- and format-independent responses from the navigation-related information server and formulate language- and format-specific responses that are sent to the end users.

In one embodiment, the language and format-independent data structures provided by the navigation-related information server are in XML format. The customer-interface servers use XML style sheets to formulate language and format-specific responses that are sent to the end users.

DETAILED DESCRIPTION OF THE PRESENTLY PREFERRED EMBODIMENTS

I. Overview of Navigation system

Figure 1:
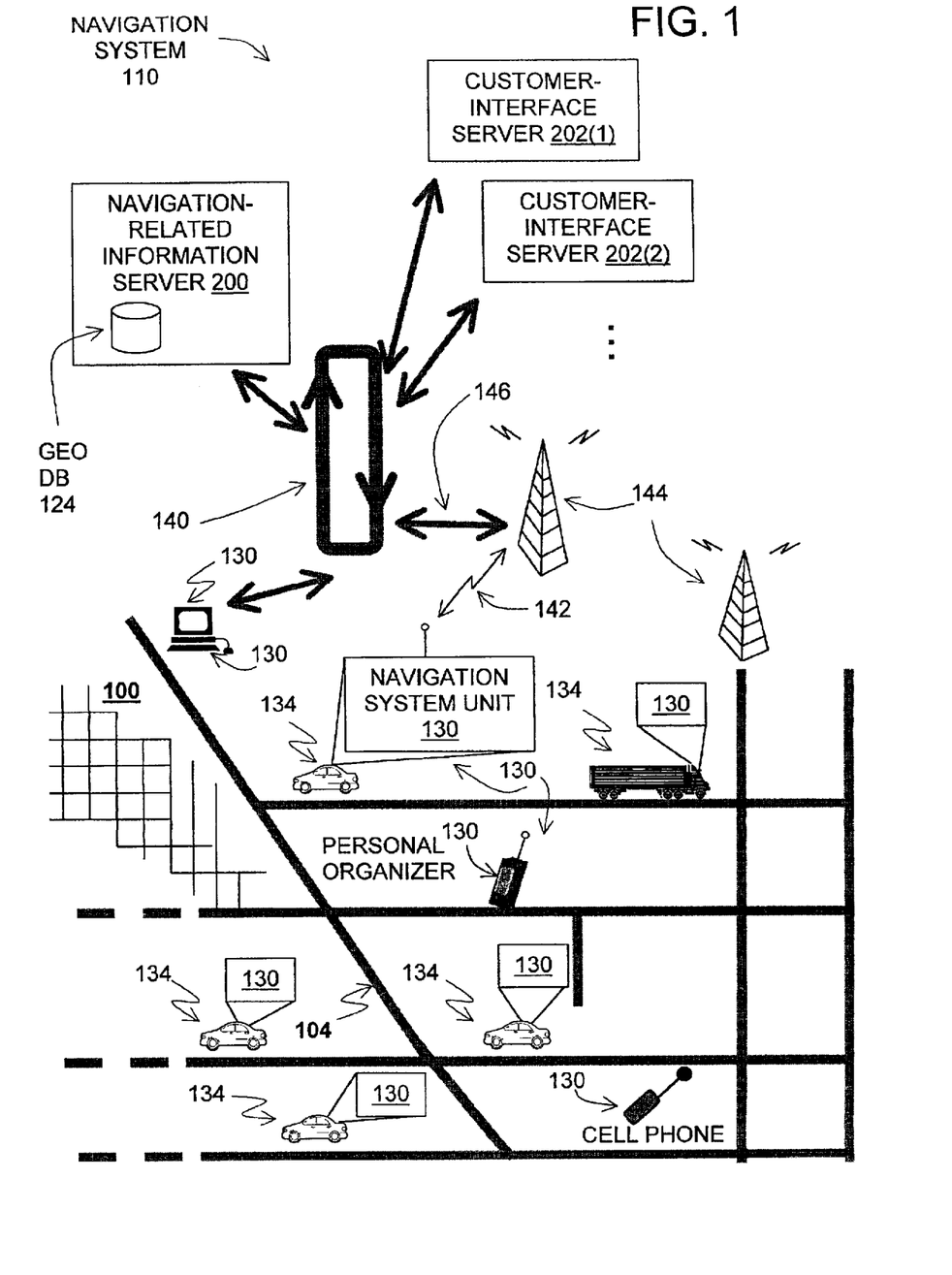
FIG. 1 is a block diagram illustrating components of an embodiment of a navigation system that provides navigation services to end users' computing devices located throughout a geographic region.

FIG. 1 shows a geographic region 100. The geographic region 100 may correspond to a metropolitan or rural area, a state, a country, or combinations thereof, or any other area of comparable size. Located in the geographic region 100 is a road network 104.

A navigation system 110 serves end users (e.g., vehicle drivers and passengers, as well as other persons and businesses) in the geographic region 100. The navigation system 10 is used by the end users to obtain navigation-related services. The navigation-related services include information about travel along the road network 104, including route calculation and guidance. The navigation-related services may also include people and business finding services (e.g., electronic yellow and white pages), map display, point of interest searching, destination selection, and so on.

The navigation system 10 is a combination of hardware, software and data The navigation system 110 includes remote components, i.e., hardware, software or data located remotely from the end users, and local components, i.e., hardware and/or software located physically with each end user.

The local components of the navigation system 10 include the various electronic devices and computer platforms 130 operated by end users to request and obtain navigation-related services using the navigation system 10. These various end user computer platforms (also referred to as "end user electronic devices" or "client computing platforms" or the like) may include general purpose devices, such as cell phones, personal digital assistants (PDAs, PalmPilot®-type devices), personal computers (desktop and portable), as well as special purpose devices, such as specially designed navigation system units located in vehicles 134.

The end user devices 130 have the appropriate hardware and software to transmit and receive data over a data network 140. The data network 140 may use any suitable technology and/or protocols that are currently available, as well as technology and/or protocols that become available in the future. For example, the data network 140 may use WAP, TCP/IP, i-mode, etc. More than one protocol may be used in the data network 140 with appropriate conversions. The data network 140 may include the Internet.

The data network 140 may include a wireless portion 142. The wireless portion 142 may be implemented by any suitable form of wireless communication, including cellular, PCS, satellite, FM, radio, or technologies that may be developed in the future. The wireless portion 142 may include one or more transmitters 144, such as a transponder tower, an antenna tower, an FM tower, satellites, or other suitable means. The transmitters 144 include an appropriate communication link 146 to the network 140. This link 146 may be land-based or may be wireless. The transmitters 144 include suitable technology that enables two-way communication with the mobile end user computing platforms 130.

Figure 2:
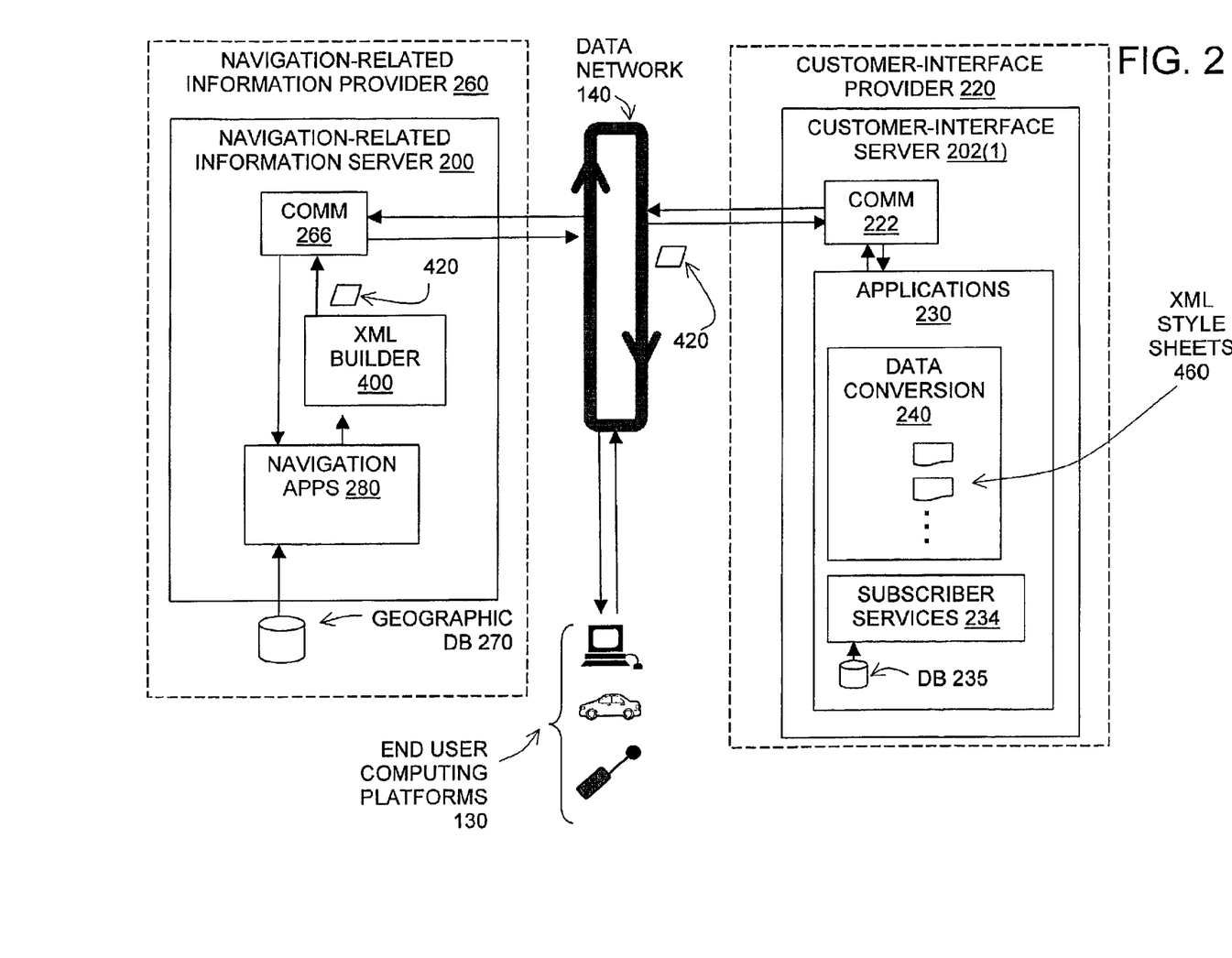
FIG. 2 is a block diagram showing components of the navigation-related information provider and customer-interface provider in FIG. 1.

II. The Navigation-Related Information Server and the Customer-Interface Server The remote components of the navigation system 110 include a navigation-related information server 200 and one or more customer-interface servers 202(1), 202(2) . . . FIG. 2 is a block diagram showing some of the components of the navigation-related information server 200 and one of the customer-interface servers 202(1). (The customer-interface server 202(1) is representative of all the other customer-interface servers, which may have similar or identical components.)

A. The Customer-interface Server 202(1)

The customer-interface server 202(1) is maintained and operated by a customer-interface provider 220.

The customer-interface server 202 includes a communications system 222. The communications system 222 interfaces with the data network 140. The communications system 222 has the appropriate hardware and software to receive messages from and send messages to the end user electronic devices 130 over the data network 140. The communications system 222 is also capable of receiving messages from and sending messages to the navigation-related information server 200. In one embodiment, the network used by the customer-interface server 202(1) to communicate with the navigation-related server 200 is the same data network (i.e., network 140) used to communicate with the end user electronic devices 130.

Included on the customer-interface server 202(1) are customer-interface applications 230. One of the customer-interface applications 230 is a subscriber services application 234. In order to use some or all of the services provided by the customer-interface provider 220, end users may be required to be subscribers. The subscriber services application 234 provides services that support this function. Some of the subscriber services include enrollment, payments, renewals, confirmation of subscriber status, targeted advertising, and so on. The subscriber services application 234 may use a subscriber database 235 that contains various kinds of information concerning the various subscribers.

Also included among the customer-interface applications 230 on the customer-interface server 202(1) are data conversion applications 240. The data conversion applications 240 receive the messages requesting navigation-related services from the end users devices 130, extract pertinent content regarding the type of navigation-related information desired by the end users, and formulate requests to send to the navigation-related information server 200 for the navigation-related data needed to response to the end user requests. The data conversion applications 240 also receive data messages containing navigation-related data from the navigation-related information server 200, extract the navigation-related information from the messages received from the navigation-related information server 200, formulate meaningful language- and format-specific navigation guidance or other information for the end users, and transmit the meaningful language- and format-specific guidance or other information to the end user computing platforms 130. The data conversion applications 240 are described in more detail below.

B. The Navigation-related Information Server

The navigation-related information server 200 is maintained and operated by a navigation-related information provider 260.

The navigation-related information server 200 includes a communications system 266. The communications system 266 interfaces with the data network 140. The communications system 266 associated with the navigation-related information server 200 has the appropriate hardware and software to receive messages from and send messages to customer-interface server 202(1), as well as the other customer-interface servers 202(2) . . . over a data network, which in one embodiment is the data network 140.

Associated with the navigation-related information server 200 are one more geographic databases 270. The geographic databases 270 are stored on media which may be located with the navigation-services server 200. Various storage media may be used, including fixed or hard disks, DVD disks or other currently available storage media, as well as storage media that may be developed in the future.

The geographic databases 270 include information about the roads and intersections in or related to one or more geographic regions or coverage areas (such as the geographic region 100 in FIG. 1). This information includes data specifying the positions of the roads in the covered geographic region and also includes data about features relating to the roads, such as restrictions on directions of travel on the roads (e.g., one-way streets), turn restrictions, street addresses, street names, speed limits, and so on. The geographic databases 270 may also include information about points of interest in the geographic areas, such as hotels, restaurants, museums, stadiums, offices, automobile dealerships, auto repair shops, etc. The geographic databases 270 may also include information about places, such as cities, towns, or other communities. The geographic database 270 may include other data about the geographic region.

In one embodiment, the geographic databases 270 and the data contained therein are provided by Navigation Technologies Corporation of Chicago, Ill. However, it is understood that databases developed and provided by other entities may also be suitable for use with some of the embodiments disclosed herein.

The geographic databases 270 may take a variety of different forms and/or formats. The geographic databases may be organized in one or more formats in order to facilitate the provision of various navigation-related information and functions. Methods of organizing a geographic database to enhance the performance of certain navigation-related functions are described in U.S. Pat. Nos. 5,974,419, 5,968,109 and 5,953,722, the entire disclosures of which are incorporated by reference herein.

One format that may be used for organizing the geographic databases 270 is the SDAL® format provided by Navigation Technologies Corporation. The present embodiments are not limited to any particular format and other formats may be used.

III. The Navigation Applications

Associated with the navigation-related information server 200 are navigation applications 280. The navigation applications 280 may be formed of separate component applications (also referred to as programs, subprograms, routines, or tools). The navigation applications 280 work together through defined programming interfaces. The navigation applications 280 use the geographic databases 270 associated with the navigation-related information server 200 in order to provide the various different types of navigation-related information.

Figure 3:
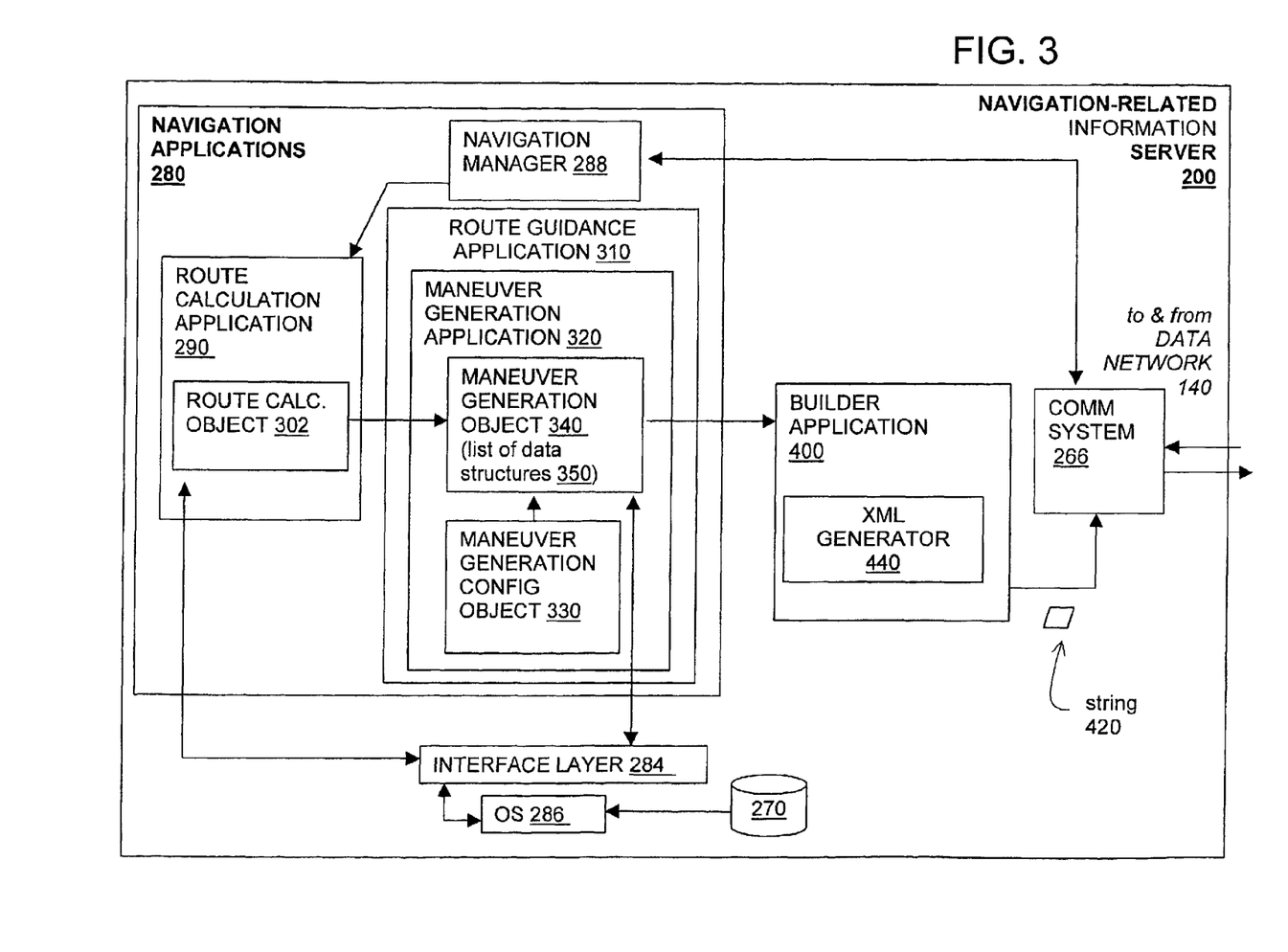
FIG. 3 is a block diagram illustrating components of the navigation applications installed on the navigation-related information server of FIGS. 1 and 2.

FIG. 3 shows some of the navigation-related applications 280 on the navigation-related information server 200. In addition to the applications shown in FIG. 3, the navigation-related information server 200 may include other navigation applications.

The navigation applications 280 are programs that provide for specific navigation functions to be performed by the navigation-related information server 200. In the embodiment of FIG. 3, the navigation applications 280 request and obtain data from the geographic database 270 and use the data to satisfy the requests for navigation information from the customer-interface servers 202(1), 202(2) . . . The navigation applications 280 may obtain the geographic data directly from the geographic database 270, or alternatively, the navigation applications 280 may obtain the data through an interface layer 284 and an operating system 286.

As shown in FIG. 3, the navigation applications 280 include a manager application 288. The manager application 288 is a program or routine that provides for an overall interface to the navigation applications on the navigation-related information server 200.

Among the navigation applications 280 on the navigation-related information server 200 is a route calculation application 290. In the embodiment of FIG. 3, the route calculation application 290 receives its input from the navigation manager 288. The route calculation application 290 receives input in the form of data that identify at least an origin and a desired destination. The route calculation application 290 may also receive additional input information that affects the calculation of the route. For example, the additional input to the route calculation application 290 may include data that specify user preferences such as avoidance of toll roads or expressways, and so on. The input may also include data that identifies the time of day at which the route will be started which may affect the route calculation.

Given data that identify the positions of an origin and destination, the route calculation application 290 uses data from the geographic databases 270 to calculate a route between the origin and the destination. The route calculation application 290 may use any of various means or algorithms for this purpose. For example, the route calculation application 290 may use either the A* algorithm or the Dykstra algorithm. Alternatively, the route calculation application 290 may use the methods for calculating routes disclosed in U.S. Pat. No. 6,192,314, the entire disclosure of which is incorporated by reference herein. The methods disclosed in U.S. Pat. No. 6,192,314 represent only some of the ways that routes can be calculated and the claimed subject matter herein is not limited to any particular method of route calculation. Any suitable route calculation method now known or developed in the future may be employed.

Regardless of the method used, the route calculation application 290 provides an output in the form of a list identifying a continuous series of roads (or segments thereof) that form a legally valid solution route between an origin and a destination. A "legally valid solution route" conforms to known traffic restrictions, such as one way streets, turn restrictions, etc. The method used by the route calculation application 290 may be designed to optimize the solution route to meet one or more predetermined criteria Such criteria may include the least travel time, the shortest distance, the fewest turns, etc. If the method used by the route calculation application 290 is designed to find a solution route that is optimized for one or more criteria, then the solution route also ideally meets these one or more criteria.

Figure 4:
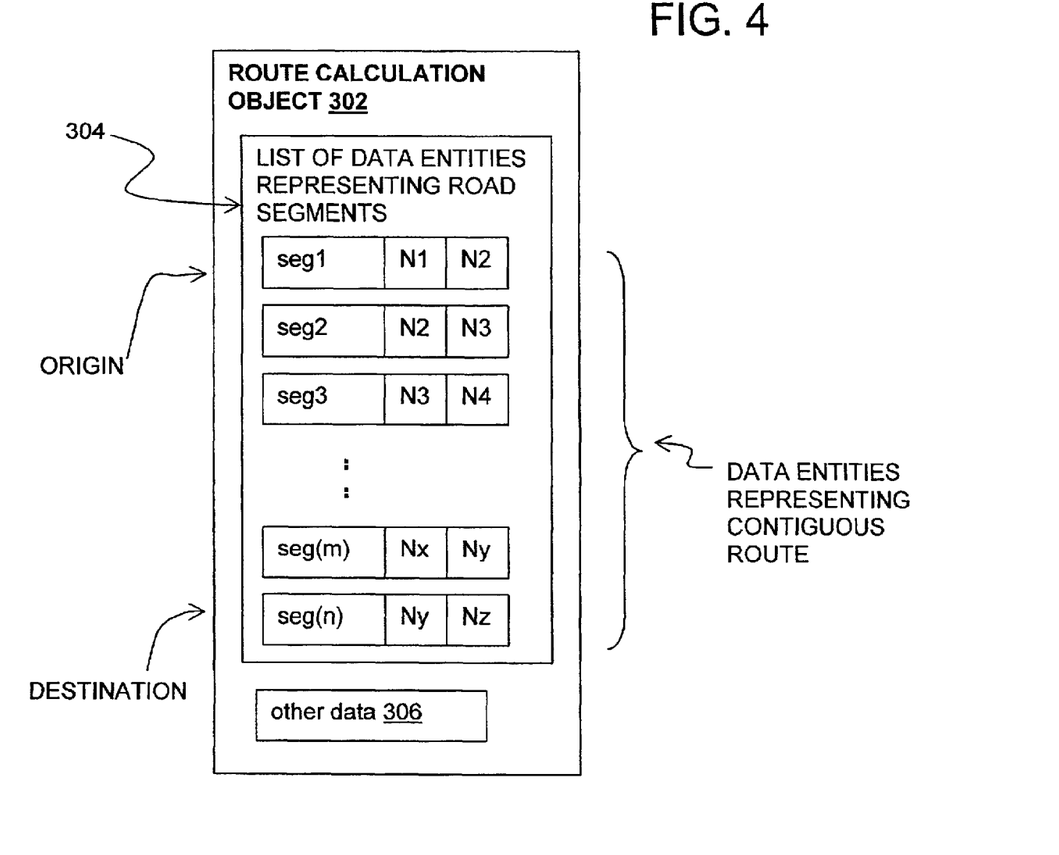
FIG. 4 is a diagram illustrating the components of the route calculation object of FIG. 3.

In the embodiment of FIG. 3, the output of the route calculation application 290 is in form of a route calculation object 302. FIG. 4 is a diagram representing the components of the route calculation object 302. The route calculation object 302 contains an ordered list 304 identifying a plurality of road segment data entities (i.e., seg1, seg2, seg3 . . . seg(n)). The plurality of data entities represent the road segments that form the continuous navigable route between the origin and the destination that had been calculated by the route calculation application 290. Since these segments form a continuous route, each segment shares a node with its successor segment in the list. For example, as shown in FIG. 4, the segments "seg2" and "seg3" are shown to have a common node "N3." The route calculation object 302 may include other information 306 in addition to the ordered list of road segment data entities.

Referring to FIG. 3, the route calculation object 302, which is created by the route calculation application 290, is used as an input to the route guidance application 310. (The route guidance application 310 is another of the navigation applications 280.) The route guidance application 310 is comprised of a maneuver generation application 320. The maneuver generation application 320 uses as its input the route calculation object 302 formed by the route calculation application 290. (Methods for providing the functions performed by the maneuver generation application 320 are disclosed in U.S. Pat. No. 6,199,013, the entire disclosure of which is incorporated by reference herein. The maneuver generation application 320 describe herein is similar to the subject matter disclosed in the referenced patent.)

The maneuver generation application 320 performs at least two functions. The maneuver generation application 320 uses the information in the ordered list 304 of segment data entities in the route calculation object 302 to determine which locations along the calculated route should be explicated to the end user with a maneuvering or advisory instruction. In addition, for each of the locations determined as requiring explication, the maneuver generation application 320 collects information needed to provide a maneuvering or advisory instruction for the particular location.

Figure 5:
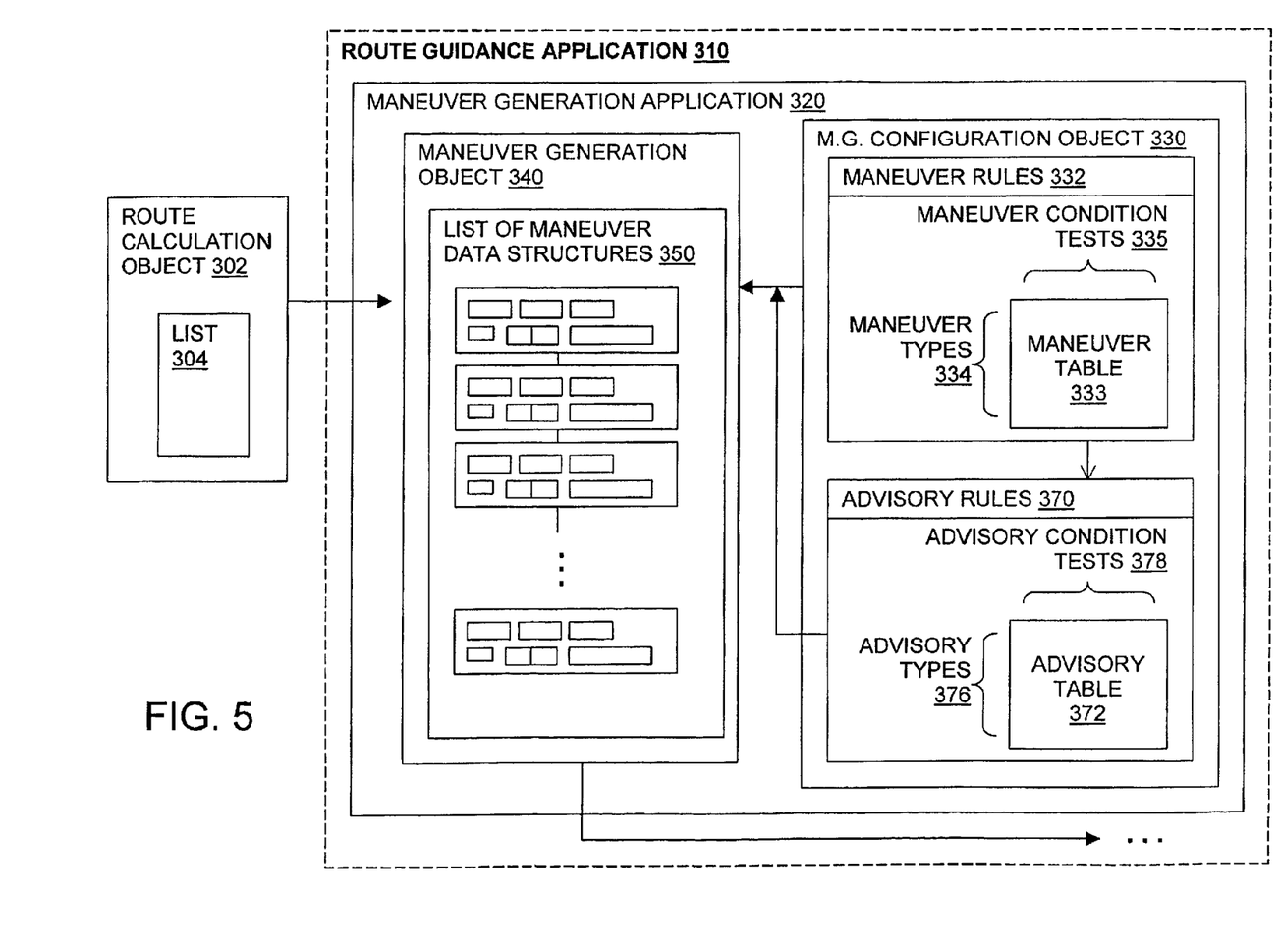
FIG. 5 is a diagram illustrating the components of the maneuver generation application of FIG. 3.

In performing these functions, the maneuver generation application 320 uses two objects. Referring to FIG. 5, the maneuver generation application 320 includes a (maneuver generation) configuration object 330 and maneuver generation object 340. The (maneuver generation) configuration object 330 contains maneuver rules 332. These maneuver rules 332 are applied using the data in the route calculation object 302 and from the geographic database 270. These rules determine when a location along the calculated route should be explicated with a maneuvering instruction. As mentioned above, the route calculation object 302 contains the list 304 of data entities that represent segments of roads. Because this list represents road segments that form a continuous route, each road segment represented by a data entity in the list 304 shares a node (i.e., an "endpoint") with a road segment represented by an adjacent data entity in the list. The maneuver rules 332 are applied at each of these nodes in the list 304.

In applying the maneuver rules 332, the direction of travel of the calculated route is taken into account. Thus, the segment by which the calculated route leads into the node being tested by the maneuver rules 332 is identified as the entry segment. The segment by which the calculated route leads out of the node being tested by the maneuver rules 332 is identified as the exit segment. In addition, all the other road segments that are not part of the calculated route, but that share this same node with the entry and exit segments are identified. The data entities that represent all these road segments are obtained from the database 270.

The maneuver rules 332 are provided in the form of a table 333. The table 333 defines a plurality of maneuver types 334 and a plurality of maneuver condition tests 335. Each of these maneuver types 334 characterizes a particular kind of roadway configuration change that can occur at the node being tested from the calculated route. Each maneuver type 334 is assigned a unique code or number.

Each of the maneuver condition tests 335 is formulated to accept only a positive or negative answer. Each maneuver type 334 defined in the table 333 is associated with a unique subset of the plurality of maneuver condition tests 335. Each maneuver condition test 335 uses the data in the data entities which had been obtained from the database 270. (such as the data associated with the entry segment, the exit segment, the accessible and inaccessible segments, and so on) to ascertain whether the condition specified in the maneuver condition test is satisfied. For each node in the calculated route 304, if all the maneuver condition tests associated with a maneuver type 334 are satisfied, a maneuver instruction is required for that the node location.

For each of the locations determined by the maneuver generation application 320 to require explication, the maneuver generation application 320 forms a maneuver data structure 350 and adds the maneuver data structure to the maneuver generation object 340. Each maneuver data structure 350 formed by the maneuver generation application 320 contains the information needed to provide a maneuvering instruction to the end user at the location along the route at which explication has been determined to be provided to the end user. Some of the data required for the maneuver data structure is included in or derived from the segment data entities that were tested to determine whether a maneuvering instruction is required at the location of the node. Additional data may be required to be obtained or derived from the database 270 by the maneuver generation configuration object.

Figure 6:
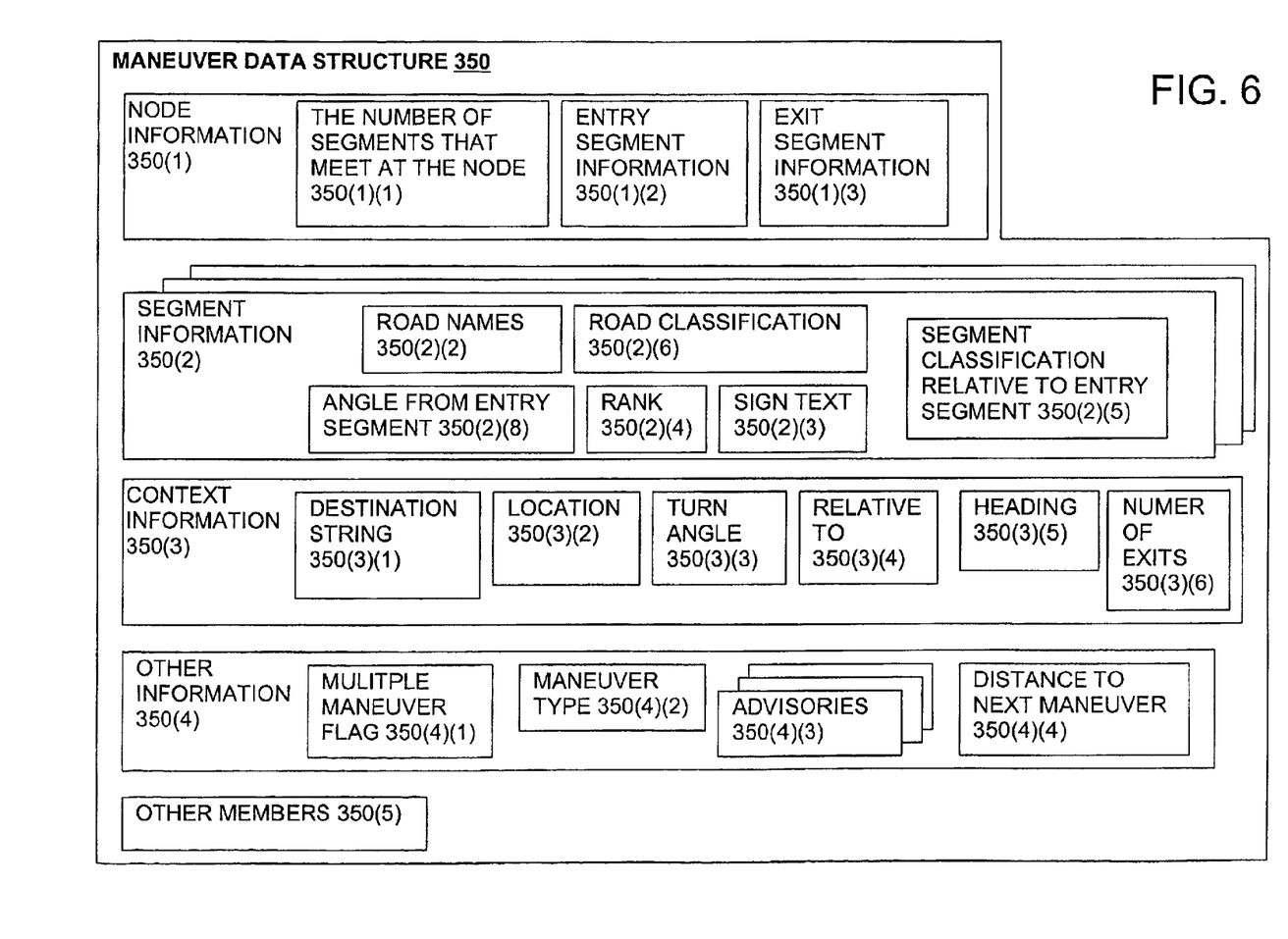
FIG. 6 is a diagram illustrating the component members of one of the maneuver data structures of FIG. 5.

FIG. 6 shows the kinds of data contained in each maneuver data structure 350. In one embodiment, the maneuver data structure 350 is formed as a C data structure. Using data from the segment data entities that share the node associated with the maneuver, as well as any additional data needed or derived from the geographic database, the maneuver generation object 340 collects data corresponding to the various members of the maneuver data structure 350. Data are collected to the extent they are available. Members of the data structure may be left empty if there is no data available (e.g., if one of the roads at a maneuver location is unnamed).

Included in the data structure 350 is a field 350(1)(1) that identifies the number of segments that meet at the node. The entry and exit segments 350(1)(2), 350(1)(3) into the node are identified. For each of the segments (entry and exit), the data structure 350 provides for identifying the name(s) of the segment (if any) 350(2)(2), sign(s) on the segment (if any) 350(2)(3), the rank of the segment 350(2)(4), the segment classification relative to the entry segment (exit, accessible, inaccessible) 350(2)(5), the database classification of the segment (e.g., controlled access, street, ramp) 350(2)(6), and the angle of the segment relative to the entry segment 350(2)(8). In addition, the data structure 350 also includes a field that can be used to identify the maneuver type (as described above) 350(4)(2), the distance to the next maneuver 350(4)(4), and whether the maneuver is included in a multiple maneuver 350(4)(1). (A multiple maneuver may be defined by the maneuver generator object when a location at which a maneuvering instruction is determined to be required is so close to an another adjacent location at which a maneuvering instruction is determined to be required that it may be preferable to present the two, or more, maneuver instructions to the end-user at the same time. The distance at which a multiple maneuver is defined is configurable and may be a function of various factors, including speed limits along the road segments, distance, rank, and so on.)

The data structure may also include fields for providing context information 350(3) for the exit road. This kind of information may be useful when the other information in the maneuver structure is not sufficient to describe the exit fully, such as when the exit segment is unnamed. The fields for context information may include a destination string 350(3)(1) which describes the exit of the maneuver in cases where the exit segment name is not sufficient (such as when it is unnamed). The context information 350(3) may also include a field for a "location" 350(3)(2) which gives the location of the exit relative to another road (e.g., before, after, ahead, behind, on the right, or on the left). The context information 350(3) may also include a field for a "turn angle" 350(3)(3)

which gives the angle to be taken to go onto the exit road. The context information may also include a field for a "heading" 350(3)(5) which can be used during the starting-off maneuver and provides the initial heading to be taken (e.g., north, south, east, west, northwest, etc.) The context information 350(3) may also include a field for "relative to" 350(3)(4). The "relative to" field 350(3)(4) is meant to be used in a starting off maneuver. The "relative to" field 350(3)(4) gives an initial intersection to be traveled toward. It can also be used in cases where the exit segment is unnamed (e.g., "turn right after Main Street"). The context information 350(3) may also include a field for "number of exits" 350(3)(6) which can be used for roundabout maneuvers. This "number of exits" field 350(3)(6) includes the number of exits to be passed traveling along a roundabout before reaching the desired exit.

In addition to the members mentioned above, the maneuver data structure 350 may include additional members 350(5).

The maneuver data structure also includes information for providing advisories. Advisories are types of useful explication information that are not necessarily associated with a maneuver. Advisories may be provided when there is a change in the road network, but a specific driving maneuver is not required. For example an advisory may be provided when entering or leaving a bridge or a tunnel. The maneuver data structure 350 includes a field that includes a listing 350(4)(3) of one or more advisory types. Referring again to FIG. 5, in addition to the maneuver rules 332 which are used for determining whether to explicate a maneuver at a particular node and forming the data structures 350 therewith, the maneuver configuration object 330 also includes advisory rules 370. The advisory rules 370 are applied to each of the nodes in the route calculation object 342. Like the maneuver rules 332, the advisory rules 370 are in the form of a table 372. The advisory rules table 372 includes a set of advisory types 376 and a set of advisory condition tests 378. Each advisory type 376 characterizes a particular kind of advisory that can be provided at a node. Each advisory type 376 is assigned a unique code or number. Each of the advisory condition tests 378 is formulated so as to permit only positive and negative results. A unique subset of the advisory condition tests 378 is associated with each different advisory type 376. If positive results are obtained for all the advisory condition tests associated with an advisory type 376, that advisory type 376 is associated with the maneuver at that location.

Unlike the rules for maneuvers, the rules for advisories do not require a unique result. Thus, for a given location along a route, there may be one advisory type, multiple advisory types, or no advisory type. The number or code for each advisory type 376 is included in the data structure 350 formed for that location.

The application of the advisory rules is independent of the application of the maneuver rules. Thus, application of the advisory rules can require that an advisory instruction be provided at a location along a route even if the application of the maneuver rules at the same location does not require that a maneuvering instruction be provided. If application of the advisory rules requires that an advisory instruction be provided at a location, but application of the maneuver rules at the same location does not require that a maneuvering instruction be provided, a maneuver data structure is formed for that location containing data for the members of the data structure to the extent the data are available. A maneuver data structure formed for such a location would have a maneuver type of "0."

The maneuver generation configuration object 340 traverses the list 344 of data entities in the route calculation object 342 so that each node along the calculated route is tested with the maneuver rules 332. A maneuver data structure 350 having information for each of the fields identified above (to the extent such information is available) is formed for each location in the calculated route at which the all the maneuver condition tests for any of the maneuver types or all the advisory condition tests for any of the advisory types are satisfied. The maneuver data structures 350 formed by this process are contained in order in the maneuver generation object 340.

Referring again to FIG. 3, the maneuver generation object 340 is provided to a builder application 400. The builder application 400 is included on the navigation-related information server 200. The builder application 400 takes the maneuver generation object 340 provided from the maneuver generation application 320, extracts the information from the maneuver generation object 340, forms a language- and format independent data structure 420 that contains the information from the maneuver generation object 340 and outputs the language- and format independent data structure 420. In the embodiment of FIG. 3, the builder application 400 is an XML (eXtensible Markup Language) builder class and the language- and format independent data structure 420 is an XML string. The language- and format independent data structure 420 is distributed in at least two ways. These two ways include saving the generated string 420 into a file or sending the generated string 420 to its caller, i.e., the customer-interface server 202.

In one embodiment the builder application 400 is implemented using C++. In this embodiment, the builder application 400 includes an XML generator 440. The XML generator 440 takes the maneuver generation object 340 and creates the string 420. The string 420 contains the XML representation of the maneuver object 340 that is passed to the communications system 266 for transmission to the customer-interface provider 220.

The following example shows the contents the XML structure. These element names would be referenced in the XML Stylesheet used by the customer-interface provider.

EXAMPLE

```
<Direction>
<Source>1975 ORCHARD ST, DES PLAINES IL</Source>
<Destination>1368 N WESTERN AVE, PARK RIDGE IL</Destination>
<Maneuver id="1">
    <ManeuverType>0</ManeuverType>
    <Advisory>
        <Type>7</Type>
    </Advisory>
    <Node>
        <ExitSegmentinfo>
            <SegmentName>ORCHARD ST</SegmentName>
            <NameChangedFlag>1</NameChangedFlag>
        </ExitSegmentInfo>
        <GeoPosition>
            <Latitude>4201745</Latitude>
            <Longitude>-8788161</Longitude>
        </GeoPosition>
    </Node>
    <Context>
        <ExitHeading>NORTH</ExitHeading>
```

```xml
</Context>
<DistToNextManeuver Units="Meters">756</DistToNextManeuver>
<DistFromOrigin Units="Meters">0</DistFromOrigin>
<TimeToNextManeuver>131</TimeToNextManeuver>
<TimeFromOrigin>0</TimeFromOrigin>
    </Maneuver>
    <Maneuver id="2">
    <ManeuverType>6</ManeuverType>
    <Node>
        <EntrySegmentinfo>
            <SegmentName>ORCHARD ST</SegmentName>
            <NameChangedFlag>0</NameChangedFlag>
        </EntrySegmentinfo>
        <ExitSegmentinfo>
            <SegmentName>E OAKTON ST</SegmentName>
            <NameChangedFlag>1</NameChangedFlag>
        </ExitSegmentInfo>
        <GeoPosition>
            <Latitude>4202426</Latitude>
            <Longitude>-8788203</Longitude>
        </GeoPosition>
    </Node>
    <Context>
        <DestinationText>E OAKTON ST</DestinationText>
        <TurnAngle>RIGHT</TurnAngle>
        <ExitHeading>EAST</ExitHeading>
    </Context>
    <DistToNextManeuver Units="Meters">3038</DistToNextManeuver>
    <DistFromOrigin Units="Meters">756</DistFromOrigin>
    <TimeToNextManeuver>274</TimeToNextManeuver>
    <TimeFromOrigin>131</TimeFromOrigin>
</Maneuver>
...
<NumManeuver>4</NumManeuver>
</Direction>
```

IV. The Data Conversion Application on the Customer-Interface Server

Referring to FIG. 2, the language- and format independent data structure 420 is transmitted from the navigation-related information server 200 over the data network 140 to the customer-interface server 202(1). When the customer-interface server receives the language- and format independent data structure 420, the data conversion application 240 extracts the maneuver data contained in the language- and format independent data structure 420. The data conversion application 240 then develops maneuvering instructions using the contents of the language- and format independent data structure 420. The maneuvering instructions are formed in a selected language of the end user that requested the navigation-related information. In addition, when forming the maneuvering instructions, the data conversion application 240 applies formatting to the instructions so that the instructions are provided on the requesting end user's computing platform.

If the language- and format independent data structure 420 that the data conversion application 240 receives from the navigation-related information server 200 is in the XML format, the data conversion application 240 may use XML style sheets 460. The style sheets 460 conform to the XML format used by the builder application 400.

In one embodiment, the data conversion application 240 provides the maneuvering instructions to the end user's computing platform in HTML format. The data conversion application 240 includes a style sheet for this purpose. According to this embodiment, the HTML style sheets used by the data conversion application 240 uses the XML data 420 provided from the navigation-related information server 200 and generates an HTML data file that contains the maneuvering instructions in HTML format. The HTML data file is then sent via the data network 140 to the end user's computing platform 130 where the HTML data file can be used to present the maneuvering instructions to the end user using any application that can handle HTML, such as an Internet browser.

V. Advantages

Several advantages follow from embodiments of the disclosed navigation systems. The navigation systems allow end users that have different types of computing platforms to obtain navigation services. The navigation systems also allow end users to receive support in different languages. The disclosed embodiments achieve these advantages by separating the functions of providing navigation-related information from the customer-specific issues, such as specific language support and specific format support.

It is intended that the foregoing detailed description be regarded as illustrative rather than limiting and that it is understood that the following claims including all equivalents are intended to define the scope of the invention.

I claim:

1. A navigation system comprising:
   end user electronic devices;
   a customer-interface server; and
   a navigation-services server,
   wherein said end user electronic devices send requests for navigation services to said customer-interface server and receive responses to said requests from said customer-interface server;
   wherein said customer-interface server includes programming that, upon receiving said requests from said end user electronic devices, transmits query messages over the Internet to said navigation-services server, wherein said query messages request navigation information for responding to said requests;
   wherein said navigation-services server receives said query messages from said customer-interface server, and using navigation applications installed on said navigation-services server and a geographic database associated therewith, formulates language-independent reply messages to said query messages, and sends said language-independent reply messages to said customer-interface server, and
   wherein said customer-interface server further includes programming that, upon receiving said language-independent reply messages from said navigation-services server, formulates said responses and sends said responses to said end user electronic devices.

2. The navigation system of claim 1 wherein said requests for navigation services from said end user electronic devices are sent to said customer-interface server over the Internet.

3. The navigation system of claim 1 wherein said language-independent reply messages are in XML format.

4. The navigation system of claim 1 wherein said customer-interface server uses XML stylesheets to formulate the responses that are sent to said end user electronic devices.

5. The navigation system of claim 1 wherein the responses that are sent to said end user electronic devices are in HTML format.

6. The navigation system of claim 5 wherein said customer-interface server uses an XML stylesheet to formulate the responses that are sent to said end user electronic devices into HTML format.

7. A method for providing routing information using a navigation system, the method comprising:

on a customer-interface server, receiving a request over a data network from an end user for route guidance to a destination;

from the customer-interface server, sending a message over the data network to a navigation-related information server for maneuvering instructions;

on the navigation-related information server, after receiving the message from the customer-interface server, calculating a route to the destination and determining a series of maneuvers for traveling along a route to the destination;

on the navigation-related information server, forming a language- and format-independent data structure that represents the series of maneuvers;

from the navigation-related information server, sending the language- and format-independent data structure over the data network to the customer-interface server;

on the customer-interface server, using the language- and format-independent data structure received from the navigation-related information server to form language- and format-specific maneuvering instructions; and from the customer-interface server, providing the form language- and format-specific maneuvering instructions to the end user over the data network.

8. The method of claim 7 wherein the language- and format-specific maneuvering instructions are in HTML format.

9. The method of claim 7 wherein the language- and format-independent data structure is in XML format.

10. The method of claim 7 wherein the data network comprises the Internet.

11. The method of claim 7 wherein said customer-interface server uses an XML stylesheet to form the language- and format-specific maneuvering instructions.

* * * * *